United States Patent [19]

Hayashi

[11] 3,889,077

[45] June 10, 1975

[54] TIRE AIR PRESSURE SENSOR SWITCH WITH TEMPERATURE RESPONSIVE BIMETALLIC FIXED CONTACT ASSEMBLY

[75] Inventor: Tadashi Hayashi, Yokosuka, Japan

[73] Assignee: Nissan Motor Company Limited, Yokohama, Japan

[22] Filed: Feb. 19, 1974

[21] Appl. No.: 443,619

[30] Foreign Application Priority Data
Feb. 20, 1973 Japan............................. 48-20333
Mar. 16, 1973 Japan............................. 48-29978

[52] U.S. Cl............. 200/61.25; 200/83 P; 200/83 S
[51] Int. Cl. ......................................... H01h 35/24
[58] Field of Search ............ 200/61.25, 61.26, 83 P, 200/83 N, 83 S, 83 SA; 337/373, 330, 334, 360, 373

[56] References Cited
UNITED STATES PATENTS
2,520,353  8/1950  DelCampo et al............... 200/61.25
2,861,151  11/1958 Moore ............................. 337/373 X
3,668,347  6/1972  Korsgren ....................... 200/83 P X Primary Examiner—James R. Scott

[57] ABSTRACT

A tire air pressure sensor which has a diaphragm mounted on the casing thereof for responding to the variation of tire air pressure, a spring member having movable contacts at its both ends, and stationary contacts mounted on the casing and opposite to the movable contacts, said contacts being contained in a closed space.

4 Claims, 8 Drawing Figures

TIRE AIR PRESSURE SENSOR SWITCH WITH TEMPERATURE RESPONSIVE BIMETALLIC FIXED CONTACT ASSEMBLY

This invention relates to tires of an automobile, and more particularly to a tire air pressure sensor used for a tire air pressure reduction warning device.

The tire pressure sensor is used for ensuring the safety of a running vehicle or automobile and is therefore required to sensitively and accurately detect the reduction of tire pressure.

Heretofore, various studies have been made, and various types of tire pressure sensors have been developed. However, they are not perfect and have disadvantages in that they are complicated in the switching mechanism, low in durability, low in sensitivity in opening and closing the switches, and have hysteresis problems. In addition, it is sometimes difficult to freely adjust the opening and closing timing of the switch in response to the tire pressure and thus their scope of application is very limited.

Therefore, the present inventor has proposed heretofore a tire pressure sensor which has a diaphragm actuated in response to the tire air pressure, a leaf spring interposed between the diaphragm and the free end of the movable contact which rotates in the direction opposite to the stationary contact or in the direction towards the stationary contact and so disposed as to produce snap action.

However, since the tire pressure sensor of such construction adopts the leaf spring to urge the diaphragm against the tire air pressure thereby defining the balanced position of the diaphragm, the leaf spring must be thick to some extent. Therefore, the leaf spring having such thickness does not perform a desired snap action completely and accordingly the switch is not sensitive enough in the opening and closing operation, and therefore its durability is deteriorated. Thus it has still the disadvantages of the conventional tire air pressure sensor.

Moreover, the air tire pressure sensor thus proposed by the present inventor has difficulty in adjusting the opening and closing timing of the switch due to its structural limitations, and is therefore limited in its application scope depending upon its original design. Therefore it is difficult to be applied to the predetermined tire air pressure varying according to the travelling conditions.

In addition the air in the tires has some moisture which may sometimes be liquefied according to the conditions of the atmosphere or travelling condition, or impure gases contained in the air may penetrate into the tire. Thus, the portion of the tire contacting with the tire air pressure sensor may be corroded with moisture droplets, impure gases, dust, etc. In the worst case, improper contacting of the contacts takes place, and accordingly the warning device for the abnormal state of the tire becomes impossible to operate.

The present invention also contemplates to provide a tire air pressure sensor which may shut off the contacting portion from the atmosphere and may be contained in a sealed space thereby to improve the durability of the contacting portion.

It is, therefore, an object of the present invention to provide a tire air pressure sensor which improves the tire air pressure sensor previously proposed by adding another spring for maintaining the balance of the diaphragm against the tire air pressure thereby enabling the leaf spring to take only snap action for opening and closing the switch, and thus maing the leaf spring thin to provide sensitive opening and closing of the switch.

It is another object of the present invention to provide a tire air pressure sensor which may be easily adjusted to obtain the desired opening and closing timing of the switch.

It is still another object of the present invention to provide a tire air pressure sensor which may automatically change the opening and closing timing of the switch in response to the temperature and may be adapted to meet the travelling conditions at all times.

It is still another object of the present invention to provide a tire air pressure sensor which has inert gas in the sealed space for containing the contacting portion thereby to further improve the durability of the contacting portion of the tire air pressure sensor.

These and other objects, features and advantages of the tire air pressure sensor according to the present invention will become more fully apparent from the following description taken in conjunction with the accompanying drawings, in which.

Figure 1:
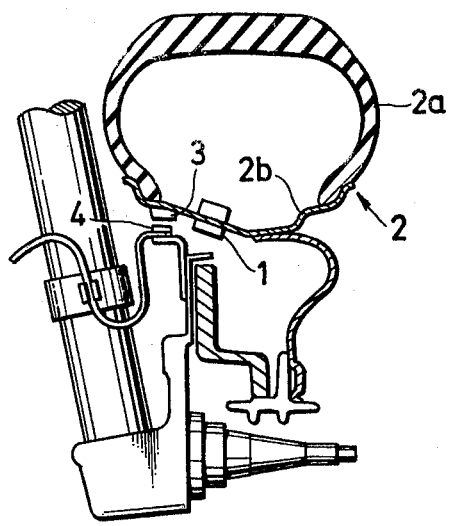
FIG. 1 is an explanatory view of the tire air pressure sensor according to the present invention.

Referring now to FIG. 1, which shows the mounting arrangement of the tire air pressure sensor 1 of the present invention. Numeral 2 indicates the assembly of a tire 2a and a tire rim 2b. The tire rim 2b mounts the sensor 1, a rotary coil 3 for oscillating the opening and closing signal of a switch of the sensor 1. The signal produced from this coil 3 is received by a stationary coil 4 provided opposite to the coil 3.

Figure 2:
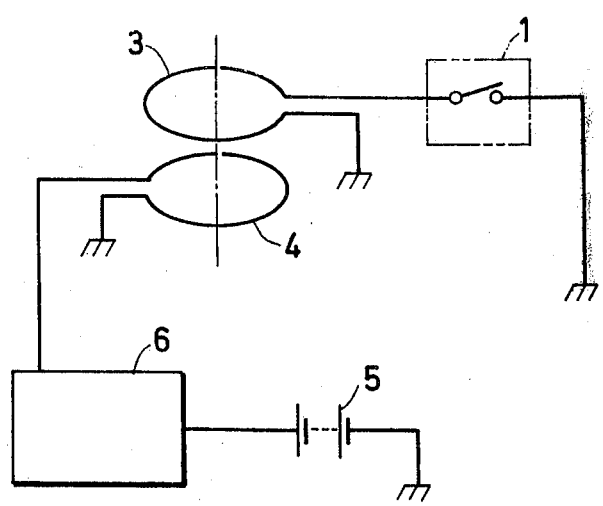
FIG. 2 is an electric circuit diagram of the tire air pressure reduction warning device.

As shown in FIG. 2, which is an electric circuit of the tire air pressure reduction warning device, the tire air pressure sensor 1 is connected at one side thereof to the ground and at the other side to the rotary coil 3 connected at the other side to the ground, and the stationary coil 4 is connected at one side to the ground and at the other to a warning device 6 connected to a battery 5 at the other side.

Figure 3:
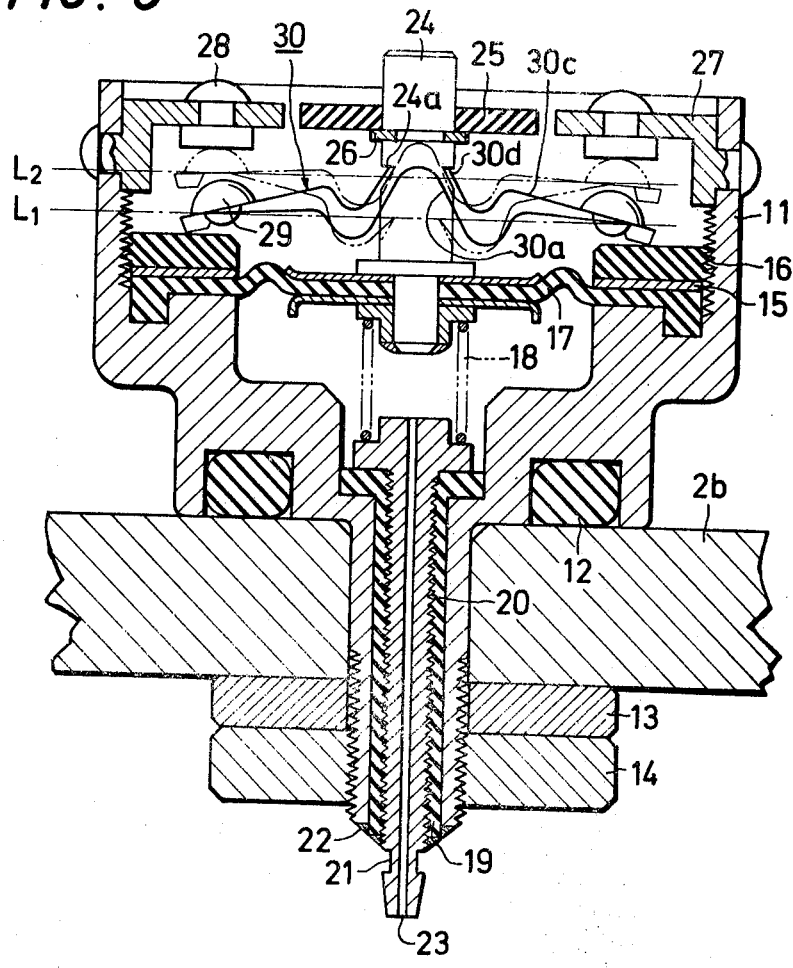
FIG. 3 is a longitudinal sectional side view of one embodiment of the tire air pressure sensor according to the present invention.
Figure 4:
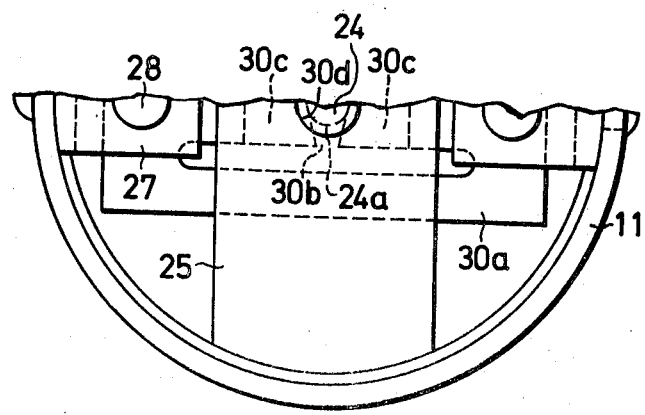
FIG. 4 is a plan view of the device in FIG. 3.

Referring now to FIGS. 3 and 4, which show one embodiment of the tire air pressure sensor constructed according to the present invention, a cylindrical casing 11 is mounted on the tire rim 2b by nuts 14 through O-ring 12 and washers 13 so that the tire air may not leak. A diaphragm 17 is mounted in the casing 11 through a spacer 15 by annular nuts 16 of insulating material and bears tire air pressure at the side disposed at the upper position in FIG. 3.

A compression spring 18 is provided so that it acts on the lower side surface (FIG. 3) of the diaphragm 17, and the set load of this spring 18 is adjusted by an adjusting member 21 screwed to the casing 11 by screws 20 through an insulator 19. After the spring 18 is adjusted, the adjusting member 21 is fixed to the casing 11 together with the insulator 19 with adhesive 22. The member 21 has a central through-hole 23 through which the atmospheric pressure is introduced into the chamber defined by the casing 11 and diaphragm 17 and containing spring 18.

A slider 24 is provided substantially at the center of the diaphragm 17 and is guided by a cover 25 of insulating material laterally mounted at the open end of the casing 11. A stopper 26 mounted on the slider 24 limits the sliding movement of the slider 24 caused by the spring 18.

Stationary contacts 28 are provided at a pair of projections 27 riveted to the casing 11. These stationary contacts are disposed at substantially the same level as that of the casing cover 25.

Figure 5:
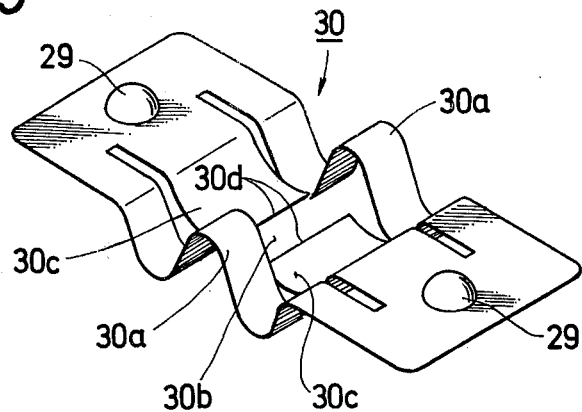
FIG. 5 is a perspective view of the leaf spring used in the sensor of the present invention.

As shown in FIG. 5, which shows the leaf spring used in the sensor of the invention, the leaf spring 30 having movable contacts 29 at its both ends opposite to the stationary contacts 28. The leaf spring 30 has at its central portion a tension spring portion 30a provided at its both sides. A compression spring portion 30c disconnected at its center 30b is provided between the tension springs 30a. The central cutout 30b of the compression spring 30c is engaged with the slider 24. More particularly, a recess 24a provided on the slider 24 engages with the opening ends 30d of the compression spring 30c. Thus the tension spring 30a and compression spring 30c can give desired tension and compression.

Since the movable range of the movable contacts 29 is limited to between the nuts 16 and the stationary contacts 28, when the recess 24a of the slider 24 moves over predetermined levels L1 and L2, the leaf spring 30 switches the position of the movable contacts 29 by a snap action to open or close the switch.

The stationary contacts 28 are connected through the projection 27 and casing 11 to the rotary coil 3 (in FIGS. 1 and 2), and movable contacts 29 are grounded through the leaf spring 30, slider 24, spring 18 and adjusting member 21. Thus, as shown in FIG. 2, the tire air pressure sensor 1 of the invention is connected to the tire air pressure reduction warning device.

The tire air pressure sensor of the invention thus constructed is operated as follows:

When the tire air pressure is zero, the compression spring 18 is extended, the leaf spring 30 is positioned as designated by a solid line, the slider 24 is contacted with the casing cover 25 through the stopper 26, and the recess 24a of the slider 24 is positioned at the upper side of the line L1 connecting the movable contacts 29. Therefore, the movable contacts 29 is urged downwardly in the Figure by the action of the compression and tension springs 30c and 30a.

When air of a predetermined pressure fills the tire, the diaphragm 17 and the slider 24 are lowered against the urging pressure of the spring 18.

If the recess 24a of the slider 24 exceeds the line L1, the compression spring 30c acts toward the direction for raising the movable contacts 29, the leaf spring 30 is inverted as designated by the phantom line, and the movable contacts 29 are urged onto the stationary contacts 28.

Therefore, as long as the tire air pressure is within the predetermined range, the leaf spring 30 is held in the position as designated by the phantom line by the action of the diaphragm 17 and slider 24 with the result that the contacts 29 are in contact with the contacts 28. Thus, the switch-closing signal from the tire air pressure sensor 1 is transmitted through the coils 3 and 4 shown in FIG. 2 to the warning device 6 thereby to inform that the tire air pressure is normal.

When the tire air pressure is gradually reduced to below a predetermined value, the spring 18 is extended by the corresponding amount with the result that the recess 24a of the slider 24 is elevated above the line L2 connecting the movable contacts 29. At this time, the leaf spring 30 changes instantaneously its position again as designated by a solid line 50 as to urge the movable contacts 29 onto the nuts 16.

Therefore, the tire air pressure sensor 1 generates the "switch-opened" signal, which is fed through the coils 3 and 4 to the warning device 6 as the signal signifying the tire pressure being abnormal, thereby to warn the reduction of the tire air pressure.

The slider 24 also acts as the adjusting mass for adapting the sensor to the normal tire air pressure varying in response to the vehicle speed, and can delay the opening and closing timing of the switch than in the case of the normal state by utilizing the influence of the high speed rotary centrifugal force. That is, when the vehicle runs at high speed, the sensor is so operated as to open and close the switch in response to the tire air pressure greater than the normal tire air pressure at low speed, thereby to adapt the tire air pressure sensor to the normal tire air pressure which increases at the high speed travelling of the vehicle.

In order that the switch may open or close properly at the normal tire air pressure corresponding to the tire on which the tire air pressure sensor is to be mounted; the screwing position of the adjusting member 21 is adjusted with respect to the casing 11 by rotating the adjusting member 21 thereby to adjust the set load of the spring 18, when the opening and closing timing of the switch is adjusted. Thus the opening and closing of the switch is properly provided according to the tire air pressure corresponding to the condition of the tire. After the adjustment, the adjusting member 21 is fixed to the casing 11 together with the insulator 19 by the adhesive 22.

Figure 6:
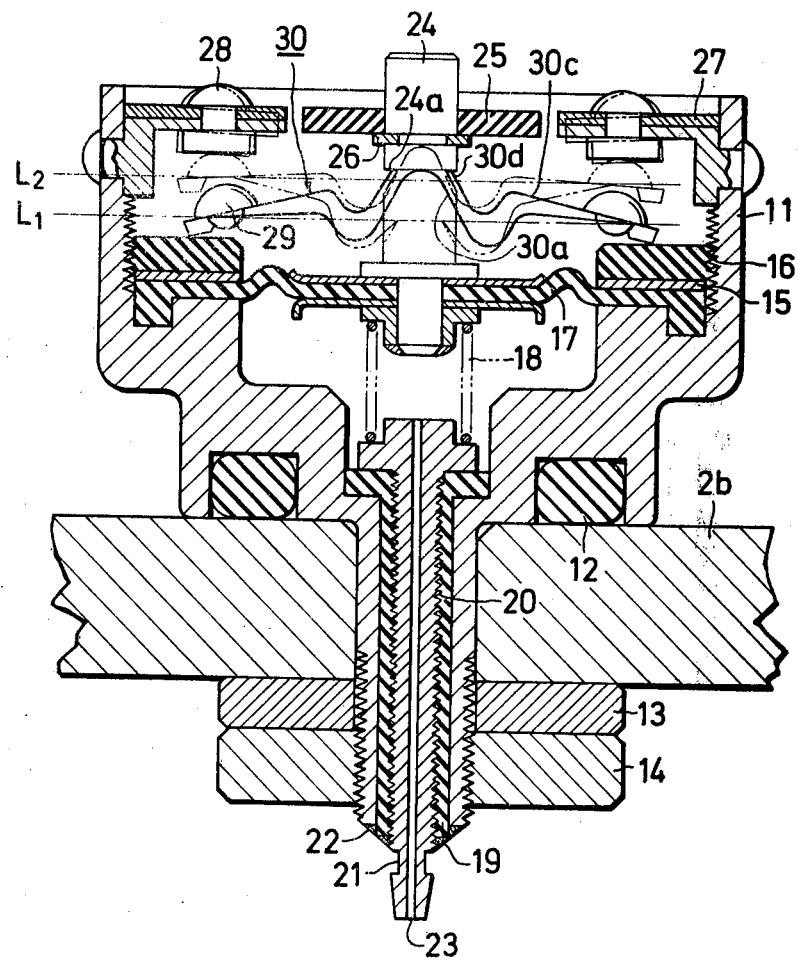
FIG. 6 is a longitudinal sectional view of the sensor as another embodiment of the present invention.

Referring to FIG. 6, which shows another embodiment of the tire air pressure sensor according to the present invention, which is constructed similarly to the first embodiment, but the projection 27 for supporting each of the stationary contacts 28 is made of bimetal of two different materials having different heat expansion coefficients and is so disposed that as the temperature increases, it is bent from the position designated by a solid line to the position as illustrated by the phantom line.

Therefore, the tire air pressure sensor of this embodiment varies its level L2 in response to the temperature in a manner that when the temperature is increased, the opening time of the switch formed by the contacts 28 and 29 can be made earlier, that is, the timing of the tire aire pressure reduction warning can be made earlier. Thus, the tire air pressure is maintained at relatively high pressure. This is important because the load applied to the tire at high temperature is larger than that applied at low temperature when the other conditions are the same, and because the internal friction of the tire can be reduced.

This embodiment of the tire air pressure sensor of the invention operates in the same way as the first embodiment to effect the same advantages as those of the first embodiment.

It should be understood from the foregoing description that since the tire air pressure sensor of the invention thus constructed comprises the spring 18 acting on the diaphragm 17 against the tire air pressure, the leaf spring 30 may perform only the snap action for opening and closing the switch and accordingly is not necessary to maintain the balance of the diaphragm 17 against the tire air pressure and therefore can be made thinner with the result that the opening and closing sensitivity of the switch becomes very high, its durability becomes excellent, and its reliability becomes high. It should also be understood that the opening and closing timing of the switch can be adjusted, even after the sensor is manufactured, by the provision of the spring 18 the set load of which can be adjusted from exterior by the adjusting member 21, and therefore the sensor thus constructed is adapted for various uses, and in addition the bimetal projection 27 for supporting the stationary contacts 28 can maintain the tire air pressure at relatively high value when the temperature of the tire is increased, thereby to reduce the load applied to the tire.

Figure 7:
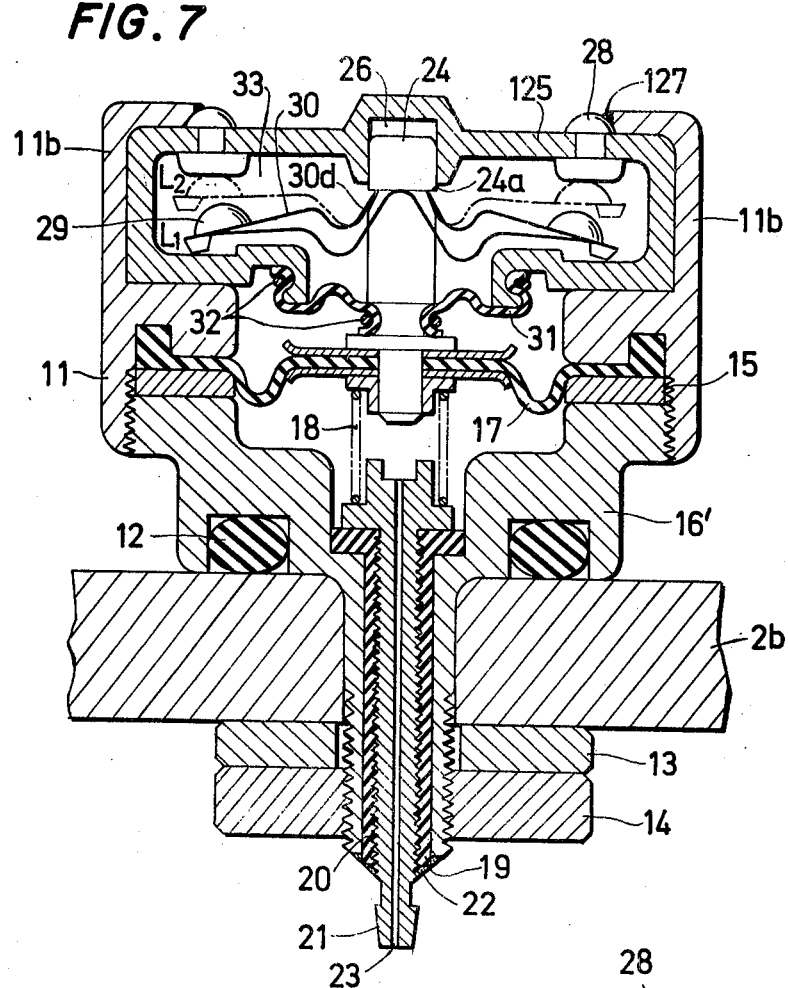
FIG. 7 is a longitudinal sectional view of the sensor as still another embodiment of the present invention.
Figure 8:
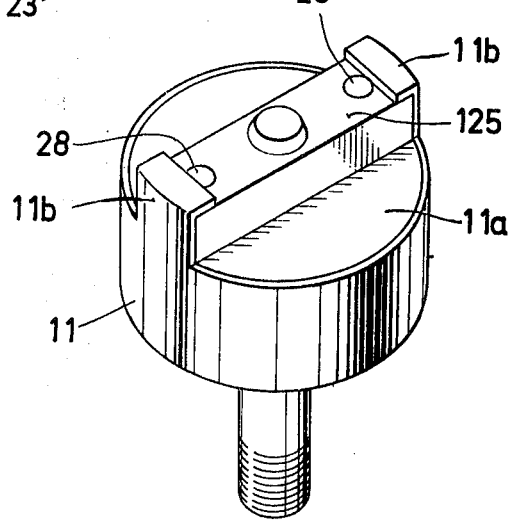
FIG. 8 is a perspective view of the sensor in FIG. 7.

Referring now to FIGS. 7 and 8, which show still another embodiment of the tire air pressure sensor, this embodiment is constructed similarly to the previous embodiments, but the diaphragm 17 is secured by thead end cover 16' and bears the tire air pressure at the side disposed upwardly in FIG. 7 through the opening 11a (FIG. 8) of the casing 11.

A box 125 is mounted on the casing 11 by bending a pair of projections 11b provided integrally to the casing 11, and stationary contacts 28 electrically connected to the casing 11 is provided on the upper wall of the box 125 by welding 127.

The movable range of the movable contacts 29 is limited to between the lower wall of the box 125 and the stationary contact 28. The lower wall of the box 125 has an opening for receiving the slider 24, and the opening is covered by rubber cap 31, and both ends of the rubber cap 31 is secured airtightly to the box 125 and cap 31 by a ring 32. Thus a closed space 33 is defined by the box 125 and cap 31 and it contains the contacts 28 and 29 with the box 125 and cap 31.

The tire air pressure sensor of this embodiment operates similarly to the previous embodiments.

It should be understood from the foregoing description that since the contacts 28 and 29 are contained in a closed space formed with the box 125 and rubber cap 31, the deterioration of the contacts due to dust and water are prevented.

What is claimed is:
1. A tire pressure sensor comprising:
 housing means;
 a diaphragm disposed in said housing means so as to sealingly divide said housing means into first and second chambers, said first and second chambers respectively communicating with the inside of the tire and the atmosphere;
 a compression spring disposed in said second chamber for urging said diaphragm toward said first chamber;
 an actuating rod disposed in said first chamber and connected at its one end to said diaphragm so as to longitudinally move with said diaphragm when pressure change within the tire occurs;
 a snap-action spring blade fixed at the central portion thereof on a generally intermediate portion of said actuating rod and having a pair of movable contacts at the opposed positions thereof, said spring blade having first and second states of operation thereof and changing its states when it receives two opposite moments about the central portion thereof, said first state being a state in which said movable contacts are near to said diaphragm and said second state being a state in which said movable contacts are remote from said diaphragm; and
 a pair of bimetallic support members fixedly disposed in said first chamber so that said spring blade is interposed between said support members and said diaphragm, said support members being constructed to bend toward said second chamber when heated and being provided with a pair of stationary contacts respectively contacting with said movable contacts when said spring blade moves into said second state thereof.

2. A tire pressure sensor as claimed in claim 1, in which said snap-action spring blade is made of thin steel plate and having therein a compression spring portion and a tension spring portion, said compression spring portion being engageable with said generally intermediate portion of said actuating rod.

3. A tire pressure sensor as claimed in claim 1, further comprising an adjusting member interposed between said second chamber and the atmosphere for adjusting the resilient force of said compression spring.

4. A tire pressure sensor as claimed in claim 3, in which said adjusting member is provided with an opening for communicating said second chamber with the atmosphere.

* * * * *